May 14, 1935.  P. L. IRVING  2,001,251

VALVE

Filed July 30, 1934

Philip L. Irving,
Inventor,
Delos F. Haynes,
Attorney.

Patented May 14, 1935

2,001,251

UNITED STATES PATENT OFFICE 2,001,251

VALVE

Philip L. Irving, Port Huron, Mich., assignor to Mueller Brass Co., Port Huron, Mich., a corporation of Michigan Application July 30, 1934, Serial No. 737,616

4 Claims. (Cl. 251—31)

This invention relates to valves, and with respect to certain more specific features, to packless valves.

Among the several objects of the invention may be noted a valve of the class described which is so constructed that it may be manually opened and closed without destroying the effectiveness of the seal against leakage from the valve; the provision of a valve of the class described which is so constructed that a sealing element, if found to be defective, may be removed and replaced without removing the valve from its line and without cutting off the flow of fluid through the valve; and the provision of a valve of the class described which is relatively simple in construction and is fool-proof. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, in which is illustrated one of various possible embodiments of the invention, Fig. 1 is a front elevation of a valve embodying the present invention;

Similar reference characters indicate corresponding parts throughout the several views of the drawing.

Figure 1:
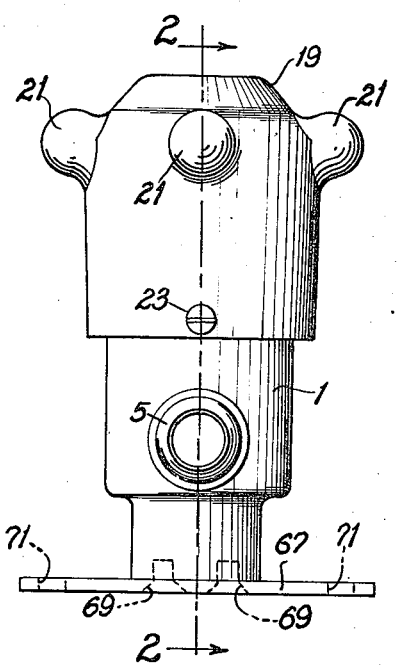
Figure 2:
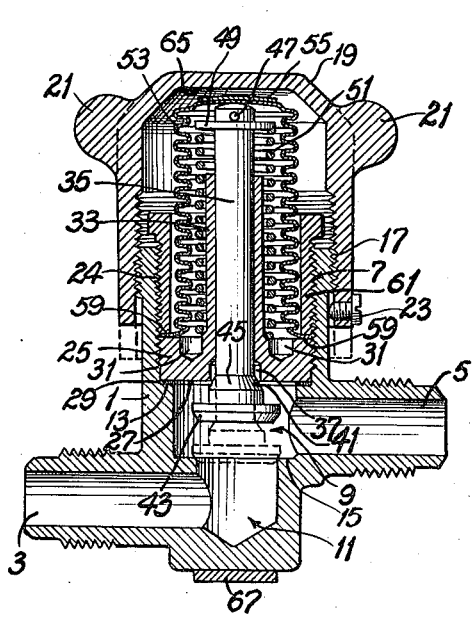
Fig. 2 is a vertical, axial cross section taken substantially on line 2—2 of Fig. 1.
Figure 3:
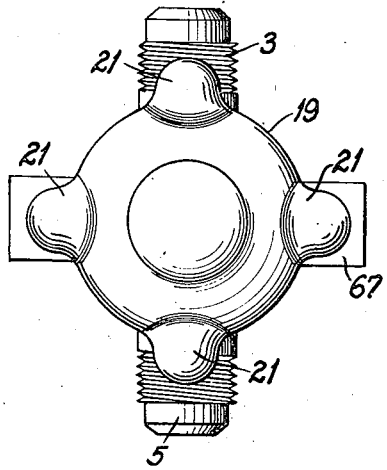
Fig. 3 is a top plan view of the valve of Fig. 1.

Referring now more particularly to Figures 1 and 2, numeral 1 indicates the valve body, which is preferably cast of a metal such as brass. The body 1 is provided with oppositely directed inlet and outlet openings 3 and 5, respectively. The inlet 3 and outlet 5 are suitably exteriorly threaded to receive couplings for making connections to high-pressure fluid lines, or the like.

The body casting 1 is interiorly hollow, being provided with a series of cylindrical openings 7, 9, and 11, of gradually decreasing diameters. Between the portion 7 and the portion 9 is a shoulder 13, and between the portion 9 and the portion 11 is a shoulder 15. The shoulder 15 forms the seat for the valve proper, to be described. It will be noted that the inlet 3 communicates with the portion 11, while the outlet 5 communicates with the portion 9. Hence, the valve seat 15 is interposed between the inlet 3 and the outlet 5.

The upper end of the casting 1 is exteriorly threaded as indicated at numeral 17 to receive cooperating interior threads on a cap or closure member 19. The cap 19 is cup-shaped, and is provided with radial ears 21 to facilitate its being turned manually. A set screw 23 is threaded radially into the lower end of the cap 19, and engages the unthreaded wall of the casting 1 to prevent unwanted removal of the cap 19 from the casting 1.

The portion 7 of the casting 1 is also interiorly threaded, as indicated at numeral 24. Into this portion 7 is first threaded a bushing element 25 having a flat lower face 27. The face 27 clamps a gasket 29 against the shoulder 13 formed between the cylindrical portions 7 and 9. The member 25 is also provided with a pair of holes 31, for receiving a spanner wrench so that it may be driven down and clamped upon the gasket 29.

The member 25 carries at its center a relatively long, upstanding bushing member 33, which receives in a relatively close fit, a valve stem 35. The lower end of the member 25 is counterbored as indicated at numeral 37, to provide an annular back-seating valve seat 41.

The valve stem 35 carries at its lower end a valve closure element 43, which is adapted to seat against the main valve seat 15. The closure element 43 also includes an upwardly facing conical face 45, which is adapted to back-seat against the valve seat 41.

At its upper end, the valve stem 35 is drilled to receive a cross pin 47, against which is placed a washer 49. A compression spring 51 reacts between the under face of washer 49 and the shoulder formed between bushing 33 and member 25, and tends at all times to maintain the valve in open position with the back-seated portion 45 seated on the seat 41.

Numeral 53 indicates a collapsible bellows, preferably made of the spring copper, bronze, brass or the like. The bellows 53 is closed at its upper end 55 and is preferably provided with a wear receiving plate 57 attached to the outer face of end 55. The lower end of the bellows 53 is flared outwardly, as indicated at numeral 59.

Figure 4:
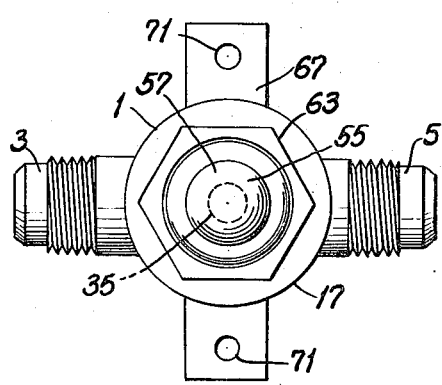
Fig. 4 is a top plan view of the valve of Fig. 1 with a cover portion removed.

In assembly, the flare 59 of the bellows 53 is clamped against the upper face of element 25 by the lower end of a plug 61 threaded into the upper portion 7 of the casting 1. The plug 61 has, at its upper end, a hexagonal head 63 (see Fig. 4) to permit the application of a wrench for the purpose of driving down the plug 61 to clamp the flare 59 effectively against the upper face of element 25. The plug 61 is inwardly hollow, to pass over the bellows 53.

The operation of the valve as thus described is as follows:

The spring 51 normally maintains the valve at open position, thus permitting the passage of fluid from the inlet 3 to the outlet 5. When thus open, the spring 51 normally forces the back-seating closure portion 45 against the seat 41, thus preventing leakage of fluid along the bushing 33. This back-seating is so effected that, under normal circumstances, the plug 61 and bellows 53 may be removed from the valve without any leakage taking place. This is a valuable feature, in that it permits the replacement of the bellows 53 in the valve while it is in operation on a pressure line, without thereby permitting any leakage of fluid from the valve.

When the cap 21 is threaded down upon the casting 1 its top inner face 65 is brought to bear upon the wear receiving plate 57 of bellows 53, and hence indirectly upon the valve stem 35. As this threading continues, the stem 35 is forced downwardly until the back-seating closure 45 is removed from the seat 41. Under such circumstances, the back-seating arrangement is no longer effective to prevent leakage, but this is taken care of by the sealing bellows element 53. Any fluid leaking along the bushing 33 can escape only into the interior of bellows 53 and no further. Ultimately, as the cap 21 is further threaded down on the casting 1, the main closure element 43 is brought to seat upon the main valve seat 15, and hence flow of fluid from the inlet 3 to the outlet 5 is prevented.

It is thus seen that by threading the cap 19 up and down upon the body casting 1, the main valve 43 is caused to seat and unseat, thus controlling the flow of fluid through the valve.

The device is hermetically sealed when assembled, by the gasket 13, the bellows element 53, and if the valve stem 35 is in the proper position, by the back-seating valve 45. Hence, no leakage is possible under any circumstances of normal operation. Even if the bellows 53 should become defective, through wear or the like, such defective bellows element may be replaced by a new bellows element merely by removing the set screw 23, threading the cap 19 entirely off the body portion 1, removing the plug 61, and slipping the bellows element 53 off of the stem 35. During all this time, the spring 51 holds the valve in back-seated position, so that no leakage is possible therefrom. A new bellows element 53 may now be placed in position, and the nut 61 rethreaded into position to clamp said new bellows 53 in the aforesaid manner.

The set screw 23 likewise serves the purpose of preventing movement of the cap 19 too far upwardly.

Numeral 67 indicates a plate which is adapted for mounting the valve. The plate 67 is held on the casting 1 by screws 69, and has holes 71 therein for receiving suitable screws for mounting the valve in a system.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

I claim:

1. A valve comprising a hollow body, a valve seat in said body, inlet and outlet means disposed on opposite sides of said valve seat, said body being open at one end, an element threaded into the open end of said body and having a bushing, a valve stem slidable in said bushing, said valve stem carrying at one end a valve closure element adapted to seat upon said valve seat, spring means tending to maintain said closure element off said valve seat, a collapsible bellows element surrounding said valve stem, spring means, and bushing, said bellows element being closed at one end and outwardly flared at the other end, a plug threaded into the open end of said body and clamping the flared end of the bellows element between itself and said first-named element, the closed end of the bellows abutting the end of the valve stem, and means threaded for vertical movement relative to said body, said last-named means having a portion adapted to engage the closed end of said bellows, whereby threading of said last-named means downwardly relative to said body moves said valve stem against the reaction of said spring means to seat said valve closure element on said valve seat, and whereby threading of said last-named means upwardly relative to said body permits said spring means to move said valve stem to unseat said valve closure element from said valve seat.

2. A valve comprising a hollow body, a valve seat in said body, inlet and outlet means disposed on opposite sides of said valve seat, said body being open at one end, an element threaded into the open end of said body and having a bushing, a valve stem slidable in said bushing, said valve stem carrying at one end a valve closure element adapted to seat upon said valve seat, spring means tending to maintain said closure element off said valve seat, a collapsible bellows element surrounding said valve stem, spring means, and bushing, said bellows element being closed at one end and outwardly flared at the other end, a plug threaded into the open end of said body and clamping the flared end of the bellows element between itself and said first-named element, the closed end of the bellows abutting the end of the valve stem, and a cap threaded to said body, said cap being adapted interiorly to engage the closed end of said bellows, whereby threading of said cap down said body moves said valve stem against the reaction of said spring means to seat said valve closure element on said valve seat, and whereby threading of said cap up said body permits said spring means to move said valve stem to unseat said valve closure element from said valve seat, said first-named element having a counterbored portion providing a back-seating valve seat, and said valve closure element having a back-seating portion thereon adapted to cooperate with said back-seating valve seat under the influence of said spring means.

3. A valve as set forth in claim 1, in which the body has a shoulder therein, and a gasket, said gasket being clamped against said shoulder by said first-named element.

4. A valve as set forth in claim 2, in which the body has a shoulder therein, and a gasket, said gasket being clamped against said shoulder by said first-named element.

PHILIP L. IRVING.